(12) United States Patent
Wang (10) Patent No.: US 9,281,998 B2
(45) Date of Patent: Mar. 8, 2016

(54) METHOD AND DEVICE FOR DETECTING AND REPAIRING CHANNEL ANOMALY OF ACTIVE ANTENNA

(75) Inventor: Fang Wang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 94 days.

(21) Appl. No.: 14/379,453

(22) PCT Filed: Jun. 18, 2012

(86) PCT No.: PCT/CN2012/077112
§ 371 (c)(1),
(2), (4) Date: Aug. 18, 2014

(87) PCT Pub. No.: WO2013/131338
PCT Pub. Date: Sep. 12, 2013

(65) Prior Publication Data
US 2015/0036477 A1    Feb. 5, 2015

(30) Foreign Application Priority Data
Mar. 6, 2012  (CN) .......................... 2012 1 0057028

(51) Int. Cl.
*H04L 12/24* (2006.01)
*H04B 17/12* (2015.01)
(Continued)

(52) U.S. Cl.
CPC .......... *H04L 41/0672* (2013.01); *H04B 17/101* (2015.01); *H04B 17/12* (2015.01);
(Continued)

(58) Field of Classification Search
CPC ................................................. H04L 41/0672
See application file for complete search history.

(56) References Cited

U.S. PATENT DOCUMENTS

| 8,885,745 B2 * | 11/2014 | Oyman | ................ H04L 1/0019 375/267 |
| 2005/0047384 A1 * | 3/2005 | Wax | .................... H04W 72/046 370/338 |

(Continued)

FOREIGN PATENT DOCUMENTS

| CN | 101098178 A | 1/2008 |
| CN | 101197468 A | 6/2008 |

(Continued)

OTHER PUBLICATIONS

International Search Report in international application No. PCT/CN2012/077112, mailed on Dec. 13, 2012.

(Continued)

*Primary Examiner* — John Blanton
(74) *Attorney, Agent, or Firm* — Oppedahl Patent Law Firm LLC (57) ABSTRACT

The present disclosure provides a method and device for detecting and repairing a channel anomaly of an active antenna, and the method includes: an operation state of a transmission channel or a reception channel is determined by analyzing in real time data of a feedback coupling channel or data of the reception channel, if the operation state is anomalous, an anomaly protection is performed and an alarm is reported; a level of the alarm and a reason causing the alarm are determined, if data of the transmission/reception channel are anomalous and the anomaly protection is performed, a current antenna beam forming parameter is stored and the antenna beam forming parameter is set to zero; after the alarm has been eliminated, a stored valid antenna beam forming parameter is set to a valid value; and if a transmission/reception analog channel operates anomalously and the anomaly protection is performed, the antenna beam forming parameter is re-acquired and an acquired valid antenna beam forming parameter is configured. The present disclosure can detect states of multiple transmission/reception channels of an active antenna without an extra calibration channel, thus reducing the design cost of a system.

16 Claims, 8 Drawing Sheets

(51) Int. Cl.
   *H04W 16/28* (2009.01)
   *H04W 24/02* (2009.01)
   *H04B 17/10* (2015.01)
   *H04B 17/23* (2015.01)
   *H04B 7/06* (2006.01)
   *H04B 7/08* (2006.01)
   *H04B 17/14* (2015.01)
   *H04B 17/17* (2015.01)
   *H04B 17/18* (2015.01)

(52) U.S. Cl.
   CPC ........... *H04L41/0631* (2013.01); *H04W 16/28* (2013.01); *H04W 24/02* (2013.01); *H04B 7/0617* (2013.01); *H04B 7/0842* (2013.01); *H04B 17/102* (2015.01); *H04B 17/103* (2015.01); *H04B 17/14* (2015.01); *H04B 17/17* (2015.01); *H04B 17/18* (2015.01); *H04B 17/23* (2015.01)

(56) References Cited

U.S. PATENT DOCUMENTS

| | | | |
|---|---|---|---|
| 2008/0089433 A1* | 4/2008 | Cho | ...................... H04B 7/0615 375/267 |
| 2010/0093282 A1 | 4/2010 | Martikkala | |
| 2010/0167672 A1 | 7/2010 | Ahn | |
| 2011/0206101 A1* | 8/2011 | Matza | ...................... H04B 3/487 375/222 |
| 2013/0034010 A1 | 2/2013 | Gao et al. | |

FOREIGN PATENT DOCUMENTS

| | | |
|---|---|---|
| CN | 101312576 A | 11/2008 |
| CN | 101426219 A | 5/2009 |
| CN | 101854199 A | 10/2010 |
| CN | 101964448 A | 2/2011 |
| CN | 102082745 A | 6/2011 |
| CN | 102142869 A | 8/2011 |
| EP | 1120858 A2 | 8/2001 |
| EP | 1959591 A1 | 8/2008 |

OTHER PUBLICATIONS

English Translation of the Written Opinion of the International Search Authority in international application No. PCT/CN2012/077112, mailed on Dec. 13, 2012.

Supplementary European Search Report in European application No. 12870800.5, mailed on Feb. 3, 2015.

\* cited by examiner

METHOD AND DEVICE FOR DETECTING AND REPAIRING CHANNEL ANOMALY OF ACTIVE ANTENNA

TECHNICAL FIELD

The present disclosure relates to the field of mobile communications, and in particular to a method and device for detecting and repairing a channel anomaly of an active antenna.

BACKGROUND

With the development of mobile communication techniques, base station architectures evolve from a first generation, a second generation to a new form of base station architecture represented currently by an active antenna. In the first generation base station architecture, a Base Transceiver Station (BTS) integrates a base band and an RF transceiver unit, and transmits an RF signal to an antenna through an RF cable, and in this architecture the transmission insertion loss in the RF cable is great and thus the transmission power loss is great. The second generation base station architecture is namely the currently mainstream architecture of Building Base band Unit (BBU) and Remote Radio Unit (RRU), wherein in the downlink direction the BBU transmits a base band signal to the RRU through an optical fiber, after completing a digital IF processing, the RRU converts the base band signal to an RF signal and transmits it to an antenna via an RF jumper; while in the uplink direction, the antenna transmits an RF signal to the RRU through the RF jumper, after processed by the RRU, the RF signal becomes a base band signal and then it is transmitted to the BBU via the optical fiber. For this architecture, the RF transceiver unit is very close to the antenna, thus reducing the insertion loss caused by the RF jumper from the RRU to the antenna and improving the efficiency.

In a mobile communication system, in order to reduce as far as possible the feed line loss caused by overlong cable from a base station under a tower and an antenna on the tower, there is a trend of moving the base station to the tower, thus corresponding product modalities gradually appear. In a new modality with an active antenna as the base station architecture, a BBU also transmits a base band signal to an active antenna unit, differences compared to the architecture of BBU and RRU lie in that the active antenna divides transmission/reception channels into the scale of antenna elements, thus leading to a finer graininess. By different configurations of the active antenna elements, functions of flexible beam control and Multiple Input Multiple Output (MIMO) in practical communication networking can be achieved, thus implementing more flexible resource dynamic configuration and sharing, so as to achieve the objectives of a lower networking cost for a whole network and optimal whole-network performance.

An active antenna system is a multiple transmission/reception channel system. In an active antenna product, a plurality of transmission/reception channels are correspondingly configured with a plurality of antenna arrays, respective antenna array operates in a parallel operation state, and each path of antenna array corresponds to transmission/reception channel and a corresponding digital base band processing portion. The transmission/reception channel includes many analog circuits, which consist of a large number of IF/RF components with high voltage, high power and high current. Operation temperatures of these components are very high, thus a long time of operation readily causes aging, thereby resulting in failure of some components and thus affecting reliability of the system. Therefore, the state of the transmission/reception channel needs to be detected in real time so that the system can operate normally.

At present, a dedicated calibration channel can be used to detect in real time the state of a transmission/reception channel, and the implementation flow may include: detecting in real time respective beam forming coefficients of the plurality of transmission/reception channels to detect whether a failure occurs in respective paths of transmission/reception channels; when it is detected that a failure occurs in any one of the plurality of transmission/reception channels, acquiring a current set of beam forming coefficients corresponding to all transmission/reception channels and failure mode information corresponding to a current failed transmission/reception channel; performing optimizing processing on the current set of beam forming coefficients using a preset optimization algorithm, so as to calculate and obtain a set of beam forming coefficients with respect to the current set, i.e., a first set of beam forming coefficients more adapted to the failure mode information; and updating correspondingly beam forming coefficients of respective transmission/reception channels according to the first set of beam forming coefficients.

Figure 1:
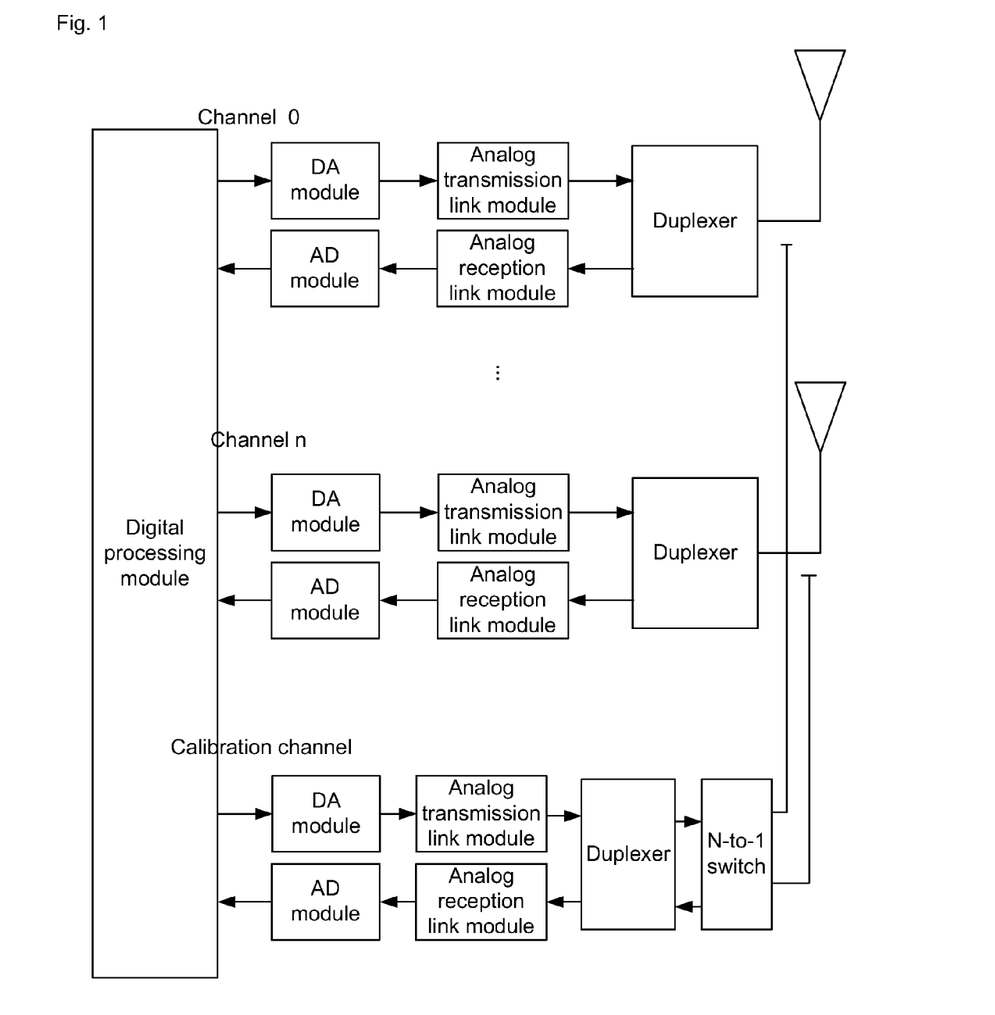
FIG. 1 is a structural diagram of a device corresponding to an existing method for detecting a state of a transmission/reception channel.

FIG. 1 is a structural diagram of a device corresponding to the existing method for detecting a state of a transmission/reception channel. As shown in FIG. 1, a dedicated calibration channel needs to be arranged to perform date acquisition, that is to say, extra analog and digital circuits are required to be arranged to perform data acquisition, thus leading to extra cost and power loss. During implementation of the existing detection method, digital signals of the calibration channel need to be acquired and calculated in real time, thus the complexity of design of switch control arrays is increased, thereby causing some pressure to the selection of base band digital devices and increasing cost of digital devices.

SUMMARY

In view of the above, the present disclosure is intended to provide a method and device for detecting and repairing a channel anomaly of an active antenna, which can detect states of multiple transmission/reception channels of an active antenna without an extra calibration channel, thus reducing the design cost of a system.

To this end, the technical solutions of the present disclosure are implemented as follows:

The present disclosure provides a method for detecting and repairing a channel anomaly of an active antenna, and the method includes:

an operation state of a transmission channel or a reception channel is determined by analyzing in real time data of a feedback coupling channel or data of the reception channel, if the operation state is anomalous, an anomaly protection is performed and an alarm is reported;

a level of the alarm and a reason causing the alarm are determined, if data of the transmission/reception channel are anomalous and the anomaly protection is performed, a current antenna beam forming parameter is stored and the antenna beam forming parameter is set to zero; after the alarm has been eliminated, a stored valid antenna beam forming parameter is set to a valid value; and if a transmission/reception analog channel operates anomalously and the anomaly protection is performed, the antenna beam forming parameter is re-acquired and an acquired valid antenna beam forming parameter is configured.

The method may further include:

it is detected in real time whether configured antenna beam forming parameter changes, if it changes, changing procedure of the antenna beam forming parameter is evaluated, if the changing procedure is abnormal, it is considered that the antenna beam forming parameter is invalid and the antenna beam forming parameter is discarded.

Wherein the method for determining an operation state anomaly of the reception channel includes:

uplink digital data of respective reception channels are acquired in real time, powers of acquired uplink digital data of respective reception channels are calculated in real time, and gains of analog channels are configured in real time according to the powers of the uplink digital data;

configured analog gain values are detected and recorded in real time, and uplink Over-The-Air (OTA) analog powers of respective reception channels and uplink OTA analog power differences between respective reception channels are calculated according to the analog gain values;

it is determined in real time whether recorded gain values are normal, it is determined in real time whether the powers of the uplink digital data change correctly with the gain values of the analog channels, and it is determined in real time whether the uplink reception OTA analog power differences between respective reception channels are normal; and if the gain values, powers or power differences are anomalous, it is represented that operation states of the reception channels are anomalous.

Wherein the method for determining an operation state anomaly of the transmission channel includes:

it is detected in sequence whether a clock, an optical port, a power of downlink base band data, a gain of downlink base band data, a power of downlink combining data, a gain of downlink combining data, a power of downlink analog data, a power of reverse channel data, a gain of reverse channel data, a phase of reverse channel data, a time delay of reverse channel data, a channel coupling power and a standing wave ratio are anomalous, if any one of detection results is anomalous, it is represented that the operation state of the transmission channel is anomalous.

The present disclosure further provides s device for detecting and repairing a channel anomaly of an active antenna, including: a beam forming parameter detection module, a beam forming parameter configuration module, a beam forming parameter acquisition module and a beam forming parameter storage module, wherein the beam forming parameter detection module is configured to determine an operation state of a transmission channel or a reception channel by analyzing in real time data of a feedback coupling channel or data of the reception channel, and perform an anomaly protection and report an alarm when it is determined that the operation state is anomalous;

the beam forming parameter detection module is further configured to: determine a level of the alarm and a reason causing the alarm, and when it is determined that data of the transmission/reception channel are anomalous and the anomaly protection is performed, notify the beam forming parameter storage module to perform a storage operation; set an antenna beam forming parameter configured by the beam forming parameter configuration module to zero; after the alarm has been eliminated, set a valid antenna beam forming parameter stored by the beam forming parameter storage module to a valid value; and when it is determined that a transmission/reception analog channel operates anomalously and the anomaly protection is performed, notify the beam forming parameter acquisition module;

the beam forming parameter configuration module is configured to configure a valid antenna beam forming parameter sent by the beam forming parameter acquisition module;

the beam forming parameter acquisition module is configured to, after receiving a notice from the beam forming parameter detection module, re-acquire the antenna beam forming parameter, and sent an acquired antenna beam forming parameter to the beam forming parameter configuration module; and the beam forming parameter storage module is configured to, after receiving a notice from the beam forming parameter detection module, store a current antenna beam forming parameter value.

Wherein the beam forming parameter configuration module is further configured to: detect in real time whether an antenna beam forming parameter configured by itself changes, and when it is determined that the antenna beam forming parameter configured by itself changes, evaluate a changing procedure of the antenna beam forming parameter, if the changing procedure is abnormal, consider that the antenna beam forming parameter is invalid and discard the antenna beam forming parameter.

When the operation state of the reception channel is detected, the beam forming parameter detection module is configured to: acquire in real time uplink digital data of respective reception channels, calculate in real time powers of acquired uplink digital data of respective reception channels, and configure in real time gains of analog channels according to the powers of the uplink digital data; and detect and record in real time configured analog gain values, and calculate uplink Over-The-Air (OTA) analog powers of respective reception channels and uplink OTA analog power differences between respective reception channels according to the analog gain values; and the beam forming parameter detection module is further configured to: determine in real time whether recorded gain values are normal, determine in real time whether the powers of the uplink digital data change correctly with the gain values of the analog channels, determine in real time whether the uplink OTA analog power differences between respective reception channels are normal, and when any one of above determination results is anomalous, perform an anomaly protection and report an alarm, and set the configured antenna beam forming parameter to zero; and after the alarm has been eliminated, set the stored valid antenna beam forming parameter to a valid value.

The beam forming parameter detection module includes: a data acquisition module, a gain control module, a gain detection module, a power calculation module, an anomaly determination module and a protection module, wherein the data acquisition module is configured to acquire in real time the uplink digital data of respective reception channels;

the gain control module is configured to configure in real time gains of analog channels according to powers of the uplink digital data;

the gain detection module is configured to detect and record in real time analog gain values configured by the gain control module;

the power calculation module is configured to: calculate in real time powers of the uplink digital data of respective reception channels acquired by the data acquisition module, and calculate uplink OTA analog powers of respective reception channels and uplink OTA analog power differences between respective reception channels according to analog gain values recorded by the gain detection module;

the anomaly determination module is configured to: determine in real time whether the gain values recorded by the gain detection module are normal, determine in real time whether the powers of the uplink digital data calculated by the power calculation module change correctly with the gain values of the analog channels recorded by the gain detection module, determine in real time whether the uplink OTA analog power differences between respective reception channels calculated by the power calculation module are normal, and when any one of above determination results is anomalous, notify the protection module; and the protection module is configured to: after receiving a notice from the anomaly determination module, perform an anomaly protection and report an alarm, and set the configured antenna beam forming parameter to zero; and after the alarm has been eliminated, set the stored valid antenna beam forming parameter to a valid value.

When the operation state of the transmission channel is detected, the beam forming parameter detection module is configured to determine in sequence whether a clock, an optical port, a power of downlink base band data, a gain of downlink base band data, a power of downlink combining data, a gain of downlink combining data, a power of downlink analog data, a power of reverse channel data, a gain of reverse channel data, a phase of reverse channel data, a time delay of reverse channel data, a channel coupling power and a standing wave ratio are anomalous, and when any one of above determination results is anomalous, perform an anomaly protection and report an alarm and set the configured antenna beam forming parameter to zero, and after the alarm has been eliminated, set the stored valid antenna beam forming parameter to a valid value.

Wherein the beam forming parameter detection module comprises: a clock detection module, an optical port detection module, a downlink base band data power detection module, a downlink base band data gain detection module, a downlink combining data power detection module, a downlink combining data gain detection module, a downlink analog data power detection module, a reverse channel data power detection module, a reverse channel data gain detection module, a reverse channel data phase detection module, a reverse channel data time delay detection module, a channel coupling detection module, a standing wave ratio detection module and an anomaly detection module;

the respective detection modules are configured to determine respectively in sequence whether the clock, the optical port, the power of downlink base band data, the gain of downlink base band data, the power of downlink combining data, the gain of downlink combining data, the power of downlink analog data, the power of reverse channel data, the gain of reverse channel data, the phase of reverse channel data, the time delay of reverse channel data, the channel coupling power and a standing wave ratio are anomalous, and when any one of determination results is anomalous, notify the anomaly detection module; and the anomaly detection module is configured to: after receiving a notice from the respective determination modules, perform an anomaly protection and report an alarm, and set the configured antenna beam forming parameter to zero; and after the alarm has been eliminated, set the stored valid antenna beam forming parameter to a valid value.

In the method and device for detecting and repairing a channel anomaly of an active antenna provided by the present disclosure, an operation state of a transmission channel or a reception channel is determined by analyzing in real time data of a feedback coupling channel or data of the reception channel, if the operation state is anomalous, an anomaly protection is performed and an alarm is reported; a level of the alarm and a reason causing the alarm are determined, if data of the transmission/reception channel are anomalous and the anomaly protection is performed, a current antenna beam forming parameter is stored and the antenna beam forming parameter is set to zero; after the alarm has been eliminated, a stored valid antenna beam forming parameter is set to a valid value; and if a transmission/reception analog channel operates anomalously and the anomaly protection is performed, the antenna beam forming parameter is re-acquired and an acquired valid antenna beam forming parameter is configured. In the present disclosure, an existing calibration channel doesn't need to be arranged, by detecting data of a data service transportation channel, a state detection of a transmission/reception channel can be implemented, thus compared to the prior art, the circuit design according to the present disclosure has a simple structure, a low cost and reduced power consumption.

DETAILED DESCRIPTION

Figure 2:
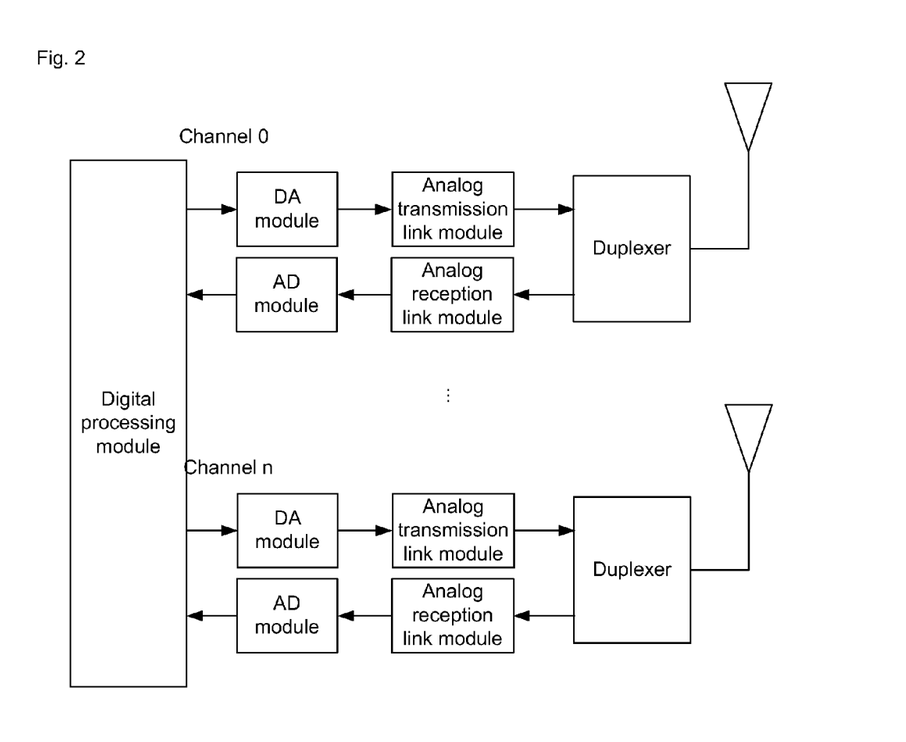
FIG. 2 is a structural diagram of a device corresponding to a method for detecting a state of a transmission/reception channel according to the present disclosure.

In the present disclosure, a dedicated calibration channel doesn't need to be additionally arranged, that is to say, the calibration channel as shown in FIG. 1 doesn't need to be arranged, and only by using the structure as shown in FIG. 2, through detecting data of a data service transportation channel, a state detection of a transmission/reception channel can be implemented.

In the present disclosure, an operation state of a transmission channel or a reception channel is determined by analyzing in real time data of a feedback coupling channel or data of the reception channel, if the operation state is anomalous, an anomaly protection is performed and an alarm is reported; a level of the alarm and a reason causing the alarm are determined, if data of the transmission/reception channel are anomalous and the anomaly protection is performed, a current antenna beam forming parameter is stored and the antenna beam forming parameter is set to zero; after the alarm has been eliminated, a stored valid antenna beam forming parameter is set to a valid value; and if a transmission/reception analog channel operates anomalously and the anomaly protection is performed, the antenna beam forming parameter is re-acquired and an acquired valid antenna beam forming parameter is configured.

Further, in the present disclosure, it is detected in real time whether a configured antenna beam forming parameter changes, if it changes, a changing procedure of the antenna beam forming parameter is evaluated, if the changing procedure is abnormal, it is considered that the antenna beam forming parameter is invalid and the antenna beam forming parameter is discarded.

The present disclosure will be further elaborated below in combination with accompanying drawings and specific embodiments.

Figure 3:
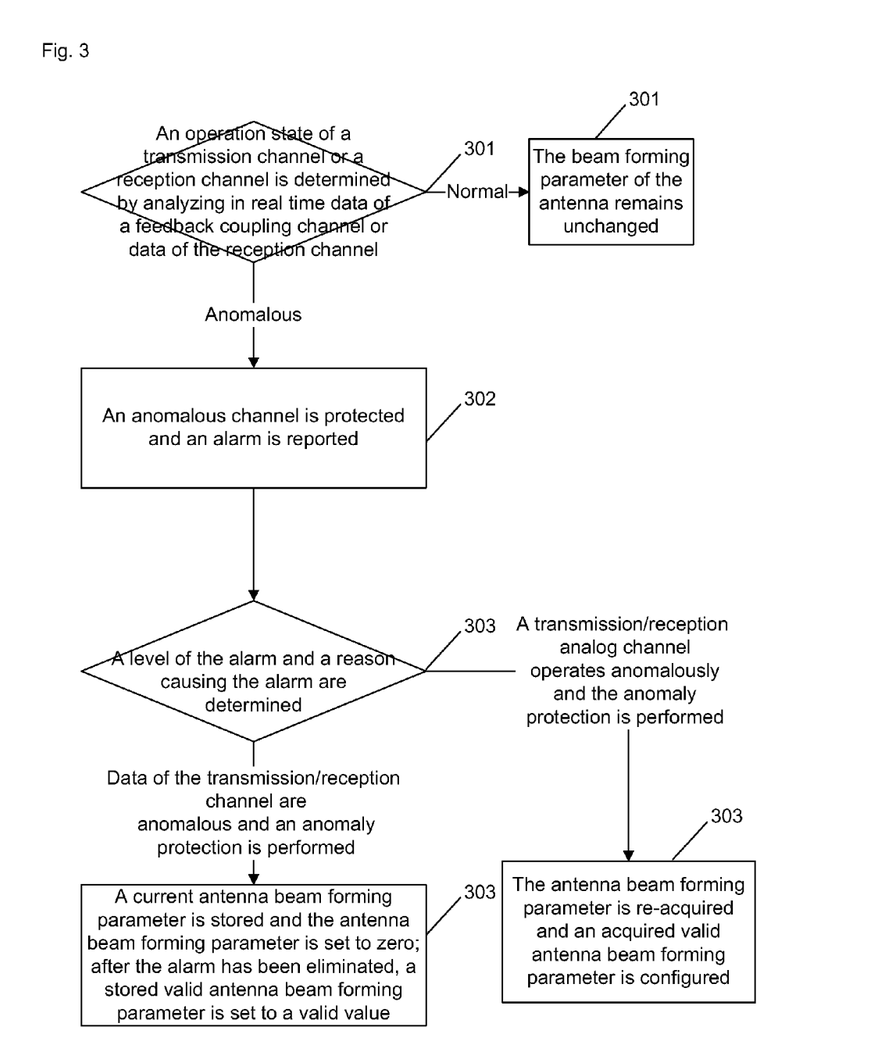
FIG. 3 is a schematic flow chart of a method for detecting and repairing a channel anomaly of an active antenna according to the present disclosure.

FIG. 3 is a schematic flow chart of a method for detecting and repairing a channel anomaly of an active antenna according to the present disclosure, as shown in FIG. 3, the method includes the following steps:

Step 301, an operation state of a transmission channel or a reception channel is determined by analyzing in real time data of a feedback coupling channel or data of the reception channel, if the operation state is anomalous, step 302 is implemented; otherwise, the antenna beam forming parameter remains unchanged.

Here the determination procedure of the operation state of the transmission/reception channel will be described respectively in detail subsequently.

Step 302, an anomalous channel is protected and an alarm is reported;

Procedures of the anomaly protection and the alarm are well known, thus the detailed description thereof will be omitted.

Step 303, a level of the alarm and a reason causing the alarm are determined, if data of the transmission/reception channel are anomalous and the anomaly protection is performed, a current antenna beam forming parameter is stored and the antenna beam forming parameter is set to zero; after the alarm has been eliminated, a stored valid antenna beam forming parameter is set to a valid value; and if a transmission/reception analog channel operates anomalously and the anomaly protection is performed, the antenna beam forming parameter is re-acquired and an acquired valid antenna beam forming parameter is configured;

Specifically, if data of the transmission/reception channel are anomalous and an anomaly protection is performed, the current antenna beam forming parameter value is stored, which is equivalent to a duplicate of the current antenna beam forming parameter, and the antenna beam forming parameter is set to zero, after the alarm has been eliminated, the previously stored valid antenna beam forming parameter is set to a valid value, i.e., the duplicate of the previously stored antenna beam forming parameter is set to a valid value, in other words, the previously stored antenna beam forming parameter is now available.

If the transmission/reception channel operates anomalously, the antenna beam forming parameter under the current mode is acquired by detecting currently configured antenna beams and a tilt angle information table, and an acquired valid antenna beam forming parameter is configured.

Wherein how and when the alarm has been eliminated is not in the scope of protection of the present disclosure.

Further, the present disclosure may also include: it is detected in real time whether configured antenna beam forming parameter changes, if it changes, changing procedure of the antenna beam forming parameter is evaluated, if the changing procedure is abnormal, it is considered that the antenna beam forming parameter is invalid and the antenna beam forming parameter is discarded; if it doesn't change, the configuration operation will not be implemented.

The process of detecting the operation state of the transmission/reception channel as mentioned in step 301 will be respectively elaborated below.

The process of performing an anomaly detection on the reception channel according to the present disclosure is as follows.

Step 1, uplink digital data of respective reception channels are acquired in real time, powers of acquired uplink digital data of respective reception channels are calculated in real time, and gains of analog channels are configured in real time according to the powers of the uplink digital data;

In the present disclosure, the analog channel is the transmission/reception analog channel in step 303.

Step 2, configured analog gain values are detected and recorded in real time, and uplink Over-The-Air (OTA) analog powers of respective reception channels and uplink OTA analog power differences between respective reception channels are calculated according to the analog gain values;

Here existing calculation methods can be used to calculate powers.

Step 3, it is determined in real time whether recorded gain values are normal, it is determined in real time whether the powers of the uplink digital data change correctly with the gain values of the analog channels, and it is determined in real time whether the uplink OTA analog power differences between respective reception channels are normal; and Step 4, if the gain values, powers or power differences are anomalous, it is represented that operation states of the reception channels are anomalous.

The process of performing an anomaly detection on the transmission channel according to the present disclosure is as follows.

Step 1, it is determined whether an clock is anomalous;

Specifically, it is determined whether a clock of a single board is normal by detecting in real time a frequency accuracy and a phase accuracy of respective clocks of the single board, and the frequency accuracy or the phase accuracy is respectively compared with a preset value to determine whether it is within a valid range, if a number of failures exceeds a threshold value, it is determined that the clock is anomalous.

Wherein the preset value and the threshold value can be changed in real time based on application scenarios.

Step 2, it is determined whether an optical port is anomalous;

Specifically, it is determined whether the optical port operates normally by monitoring in real time an optical module on-site signal, a 8B/10B coding check error indication signal of the optical port and a super-frame detection signal of the optical port, and if any one of the above three signals is anomalous, it is considered that the optical port is anomalous.

Step 3, it is determined whether a power of downlink base band data is anomalous;

Specifically, the power of the downlink base band data is compared in real time with a configured power of a cell to determine repeatedly whether the power of the downlink base band data is within a valid range, if a number of failures exceeds a threshold value, it is indicated that the data from a BBU to an active antenna are anomalous data, i.e., it is considered that the power of the downlink base band data is anomalous.

Here, after it is determined that the power of the downlink base band data is anomalous, a base band data power alarm is reported, a current antenna beam forming configuration parameter is stored, and the configured antenna beam forming parameter is set to zero, a downlink power protection is enabled, the base band data are re-configured, and after the alarm has been eliminated, the stored valid antenna beam forming parameter is set to a valid value.

Wherein the threshold value can be changed in real time based on application scenarios.

Step 4, it is determined whether a gain of downlink base band data is anomalous;

Specifically, a configured gain of the base band data is compared in real time with a preset value to determine whether the gain is within a valid range, if a number of failures exceeds a threshold value, it is indicated that the gain of the downlink base band data is failed.

Here, after it is determined that the gain of the downlink base band data is anomalous, an alarm is reported while a current antenna beam forming configuration parameter is stored, a downlink power protection is enabled, the configured antenna beam forming parameter is set to zero, and after the alarm has been eliminated, the stored valid antenna beam forming configuration parameter is set to a valid value.

Wherein the preset value and the threshold value can be changed in real time based on application scenarios.

Step 5, it is determined whether a power of downlink combining data is anomalous;

Specifically, the power of a downlink carrier combination is compared in real time with a configured power of the carrier combination to determine whether a power fluctuation is within a valid range, if a number of failures exceeds a threshold value, it is indicated that the power of the downlink carrier combination is anomalous, i.e., the power of the downlink combining data is anomalous.

Wherein the threshold value can be changed in real time based on application scenarios.

Step 6, it is determined whether a gain of downlink combining data is anomalous;

Specifically, the gain of a downlink carrier combination is compared in real time with a configured gain of the carrier combination to determine whether a gain fluctuation is within a valid range, if a number of failures exceeds a threshold value, it is indicated that the gain of the downlink carrier combination is anomalous, i.e., the gain of the downlink combining data is anomalous.

Wherein the threshold value can be changed in real time based on application scenarios.

Step 7, it is determined whether a power of downlink analog data is anomalous;

Specifically, downlink data are coupled to a digital side via a feedback channel through a downlink coupling network, then a power of acquired data is calculated and compared with a preset downlink power value to determine whether it is within a valid range, and if a number of failures exceeds a threshold value, it is indicated that the power of the downlink analog data is anomalous.

Wherein the threshold value can be changed in real time based on the application scenarios; and an existing algorithm can be used to perform the calculation.

Step 8, it is determined whether a power of reverse channel data is anomalous;

Specifically, downlink data are coupled to a digital side via a feedback channel through a reverse coupling network, then a power of acquired data is calculated and compared with a preset reverse power value to determine whether it is within a valid range, and if a number of failures exceeds a threshold value, it is indicated that the power of the reverse channel data is anomalous.

Wherein the threshold value can be changed in real time based on the application scenarios; and an existing algorithm can be used to perform the calculation.

Step 9, it is determined whether a gain of reverse channel data is anomalous;

Specifically, downlink data are coupled to a digital side via a feedback channel through a reverse coupling network, then a power of acquired data and a gain difference of the downlink data power are calculated by a related algorithm and compared with a preset power difference value to determine whether it is within a valid range, and if a number of failures exceeds a threshold value, it is indicated that the gain of the reverse channel data is anomalous.

Wherein the threshold value can be changed in real time based on the application scenarios; and an existing algorithm can be used to perform the calculation.

Step 10, it is determined whether a phase of reverse channel data is anomalous;

Specifically, downlink data are coupled to a digital side via a feedback channel through a reverse coupling network, then a phase difference of acquired reverse data and downlink data is calculated and compared with a preset phase difference value to determine whether it is within a valid range, and if a number of failures exceeds a threshold value, it is indicated that the phase of the reverse channel data is anomalous.

Wherein the threshold value can be changed in real time based on the application scenarios; and an existing algorithm can be used to perform the calculation.

Step 11, it is determined whether a time delay of reverse channel data is anomalous;

Specifically, downlink data are coupled to a digital side via a feedback channel through a reverse coupling network, then a time delay difference of acquired reverse data and downlink data is calculated and compared with a preset time delay difference value to determine whether it is within a valid range, and if a number of failures exceeds a threshold value, it is indicated that the time delay of the reverse channel data is anomalous.

Wherein the threshold value can be changed in real time based on the application scenarios; and an existing algorithm can be used to perform the calculation.

Step 12, it is determined whether a channel coupling power is anomalous;

Specifically, by comparing a power of transmission data and a power of coupling data, the power difference is calculated and compared to a preset threshold value, if a number of exceeding the threshold value exceeds a preset range, it is indicated that the channel coupling power is anomalous.

Here after it is determined that the channel coupling power is anomalous, the power of the transmission data is protected and an alarm is reported, a configured antenna beam forming parameter is set to zero, after the alarm has been eliminated, the stored valid antenna beam forming parameter is set to a valid value.

Wherein the threshold value can be changed in real time based on the application scenarios; and an existing algorithm can be used to perform the calculation.

Step 13, it is determined whether a standing wave ratio is anomalous;

Specifically, a quality problem of an engineering antenna feeder connection is detected, when an interface fails, measures related to an alarm reporting and a power amplifier protection are performed, the stored valid antenna beam forming parameter is set to a valid value.

It should be noted that when any one result of the above determinations is anomalous, it is considered that the operation state of the transmission channel is anomalous.

Figure 4:
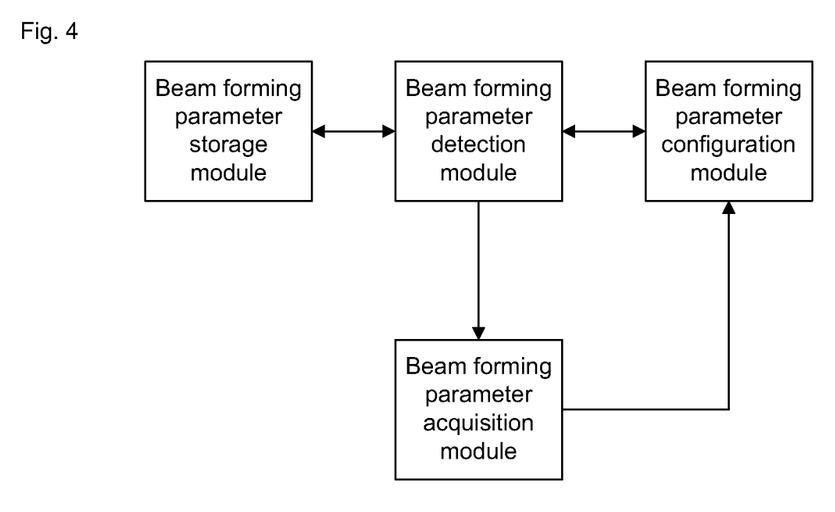
FIG. 4 is a schematic structural diagram of a device for detecting and repairing a channel anomaly of an active antenna according to the present disclosure.

FIG. 4 is a schematic structural diagram of a device for detecting and repairing a channel anomaly of an active antenna according to the present disclosure, as shown in FIG. 4, the device includes: a beam forming parameter detection module, a beam forming parameter configuration module, a beam forming parameter acquisition module and a beam forming parameter storage module, wherein the beam forming parameter detection module is configured to determine an operation state of a transmission channel or a reception channel by analyzing in real time data of a feedback coupling channel or data of the reception channel, and perform an anomaly protection and report an alarm when it is determined that the operation state is anomalous;

the beam forming parameter detection module is further configured to: determine a level of the alarm and a reason causing the alarm, and when it is determined that data of the transmission/reception channel are anomalous and the anomaly protection is performed, notify the beam forming parameter storage module to perform a storage operation; set an antenna beam forming parameter configured by the beam forming parameter configuration module to zero; after the alarm has been eliminated, set a valid antenna beam forming parameter stored by the beam forming parameter storage module to a valid value; and when it is determined that a transmission/reception analog channel operates anomalously and the anomaly protection is performed, notify the beam forming parameter acquisition module;

the beam forming parameter configuration module is configured to configure a valid antenna beam forming parameter sent by the beam forming parameter acquisition module;

the beam forming parameter acquisition module is configured to, after receiving a notice from the beam forming parameter detection module, re-acquire the antenna beam forming parameter, and sent an acquired antenna beam forming parameter to the beam forming parameter configuration module; and the beam forming parameter storage module is configured to, after receiving a notice from the beam forming parameter detection module, store a current antenna beam forming parameter value.

Further, the beam forming parameter configuration module is also configured to: detect in real time whether an antenna beam forming parameter configured by itself changes, and when it is determined that the antenna beam forming parameter configured by itself changes, evaluate a changing procedure of the antenna beam forming parameter, if the changing procedure is abnormal, consider that the antenna beam forming parameter is invalid and discard the antenna beam forming parameter.

The structure of the beam forming parameter detection module is elaborated respectively based on the transmission/reception channel.

When an operation state of the reception channel is detected according to the present disclosure, the beam forming parameter detection module is configured to: acquire in real time uplink digital data of respective reception channels, calculate in real time powers of acquired uplink digital data of respective reception channels, and configure in real time gains of analog channels according to the powers of the uplink digital data; and detect and record in real time configured analog gain values, and calculate uplink Over-The-Air (OTA) analog powers of respective reception channels and uplink OTA analog power differences between respective reception channels according to the analog gain values; and the beam forming parameter detection module is further configured to: determine in real time whether recorded gain values are normal, determine in real time whether the powers of the uplink digital data change correctly with the gain values of the analog channels, determine in real time whether the uplink OTA analog power differences between respective reception channels are normal, and when any one of above determination results is anomalous, perform an anomaly protection and report an alarm, and set the configured antenna beam forming parameter to zero; and after the alarm has been eliminated, set the stored valid antenna beam forming parameter to a valid value.

Figure 5:
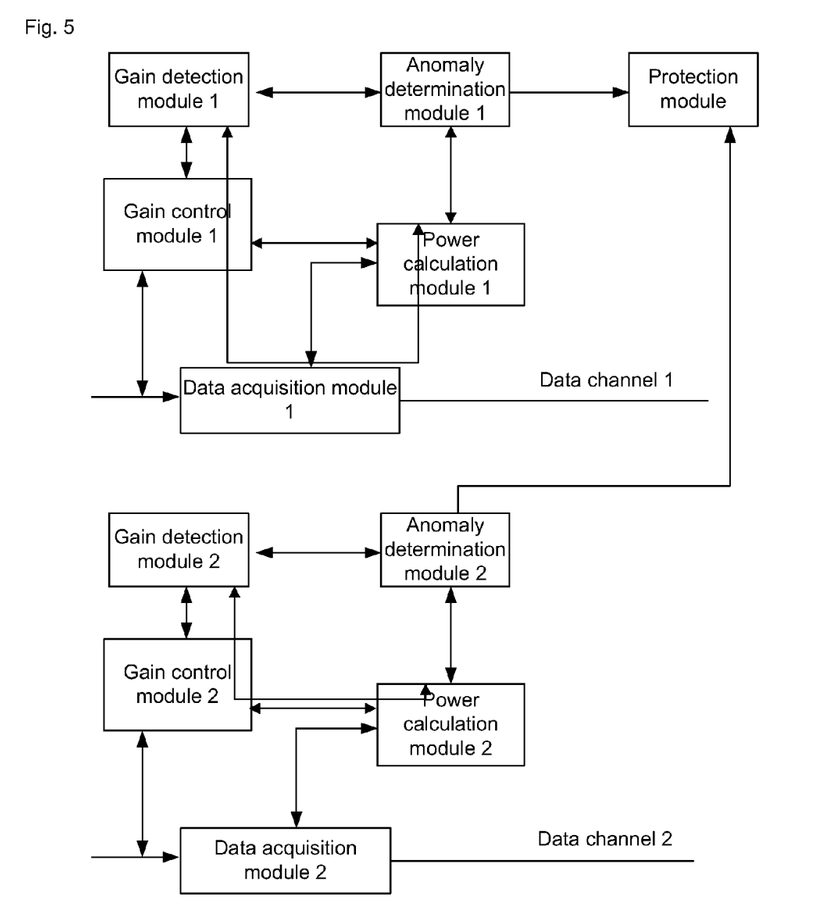
FIG. 5 is a detailed schematic structural diagram of a beam forming parameter detection module when anomaly detection is performed on a reception channel.

FIG. 5 is a detailed schematic structural diagram of the beam forming parameter detection module by taking a 2-way reception channel as an example, as shown in FIG. 5, it includes: a data acquisition module, a gain control module, a gain detection module, a power calculation module and an anomaly determination module configured respectively for each way of the reception channel, and a protection module, wherein the data acquisition module is configured to acquire in real time the uplink digital data of respective reception channels;

the gain control module is configured to configure in real time gains of analog channels according to powers of the uplink digital data;

the gain detection module is configured to detect and record in real time analog gain values configured by the gain control module;

the power calculation module is configured to: calculate in real time powers of the uplink digital data of respective reception channels acquired by the data acquisition module, and calculate uplink OTA analog powers of respective reception channels and uplink OTA analog power differences between respective reception channels according to analog gain values recorded by the gain detection module;

the anomaly determination module is configured to: determine in real time whether the gain values recorded by the gain detection module are normal, determine in real time whether the powers of the uplink digital data calculated by the power calculation module change correctly with the gain values of the analog channels recorded by the gain detection module, determine in real time whether the uplink OTA analog power differences between respective reception channels calculated by the power calculation module are normal, and when any one of above determination results is anomalous, notify the protection module; and the protection module is configured to: after receiving a notice from the anomaly determination module, perform an anomaly protection and report an alarm, and set the configured antenna beam forming parameter to zero; and after the alarm has been eliminated, set the stored valid antenna beam forming parameter to a valid value.

When the operation state of the transmission channel is detected according to the present disclosure, the beam forming parameter detection module is configured to determine in sequence whether a clock, an optical port, a power of downlink base band data, a gain of downlink base band data, a power of downlink combining data, a gain of downlink combining data, a power of downlink analog data, a power of reverse channel data, a gain of reverse channel data, a phase of reverse channel data, a time delay of reverse channel data, a channel coupling power and a standing wave ratio are anomalous, and when any one of above determination results is anomalous, perform an anomaly protection and report an alarm and set the configured antenna beam forming parameter to zero, and after the alarm has been eliminated, set the stored valid antenna beam forming parameter to a valid value.

Figure 6:
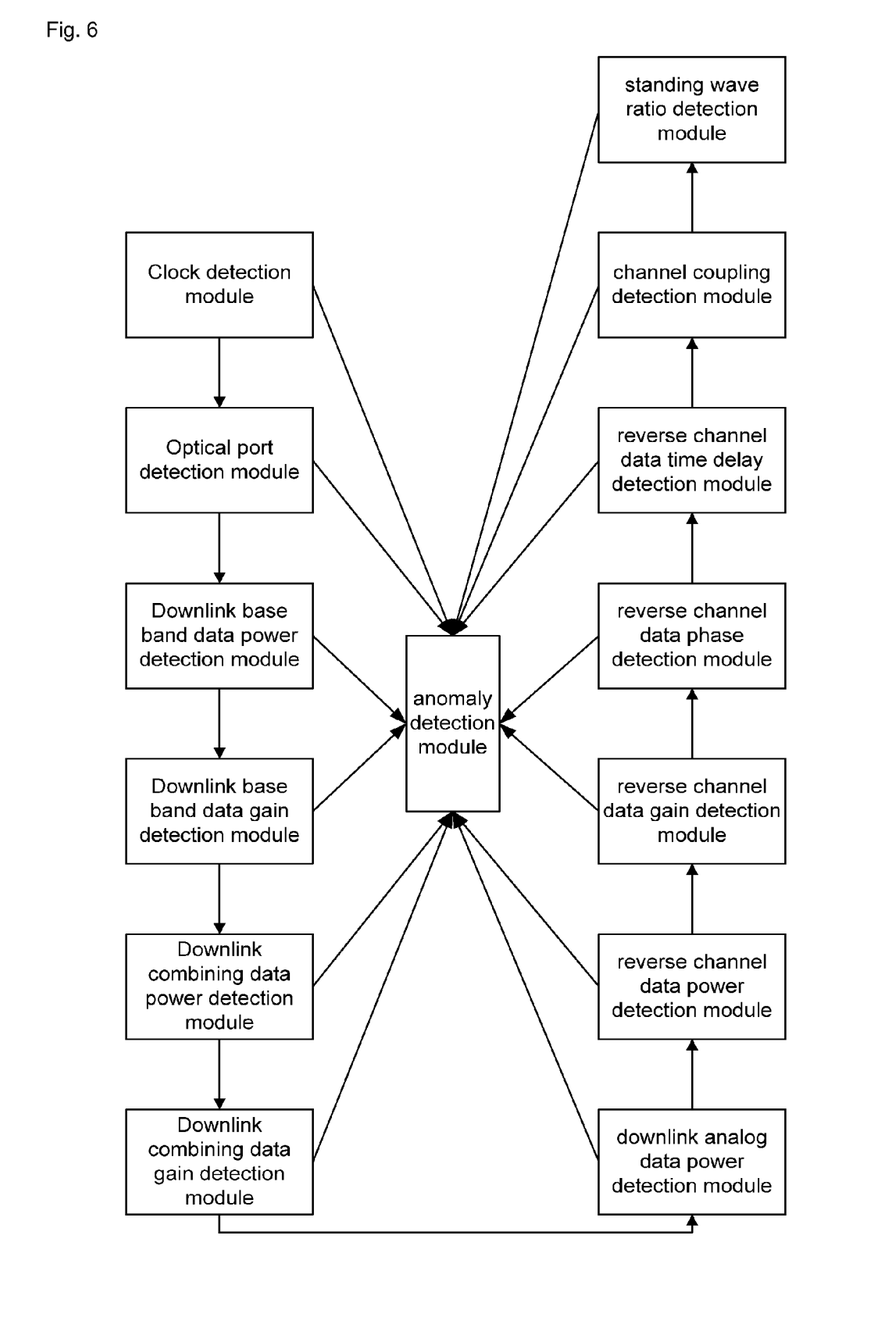
FIG. 6 is a detailed schematic structural diagram of a beam forming parameter detection module when anomaly detection is performed on a transmission channel.

FIG. 6 is a detailed schematic structural diagram of a beam forming parameter detection module when anomaly detection is performed on a transmission channel, as shown in FIG. 6, the beam forming parameter detection module includes: a clock detection module, an optical port detection module, a downlink base band data power detection module, a downlink base band data gain detection module, a downlink combining data power detection module, a downlink combining data gain detection module, a downlink analog data power detection module, a reverse channel data power detection module, a reverse channel data gain detection module, a reverse channel data phase detection module, a reverse channel data time delay detection module, a channel coupling detection module, a standing wave ratio detection module and an anomaly detection module;

the respective detection modules are configured to determine respectively in sequence whether the clock, the optical port, the power of downlink base band data, the gain of downlink base band data, the power of downlink combining data, the gain of downlink combining data, the power of downlink analog data, the power of reverse channel data, the gain of reverse channel data, the phase of reverse channel data, the time delay of reverse channel data, the channel coupling power and a standing wave ratio are anomalous, and when any one of determination results is anomalous, notify the anomaly detection module; and the anomaly detection module is configured to: after receiving a notice from the respective determination modules, perform an anomaly protection and report an alarm, and set the configured antenna beam forming parameter to zero; and after the alarm has been eliminated, set the stored valid antenna beam forming parameter to a valid value.

Figure 7:
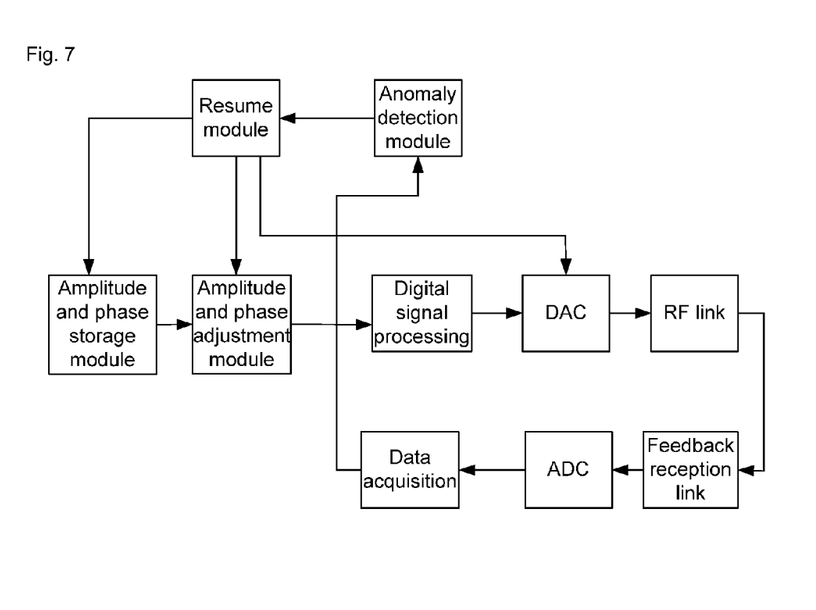
FIG. 7 is a structural diagram of a device corresponding to an anomaly detection of a transmission channel according to the present disclosure.

FIG. 7 is a structural diagram of a device corresponding to an anomaly detection of a transmission channel according to the present disclosure, as shown in FIG. 7, the anomaly detection module is namely the anomaly detection module in FIG. 6. It can be seen from FIG. 7 that the data source of the algorithm is coupling output from the feedback channel, and sent to a digital processing portion, after Analog-to-Digital Conversion (ADC), for an anomaly determination, thus there is no need of a separate transmission calibration coupling channel for acquiring data.

The present disclosure applies to a real-time detection of all multiple transmission/reception channel systems, and to existing and upcoming active antenna systems. Embodiments of base station architectures of a wireless access network to which the present disclosure is applied are described below with reference to the accompanying drawings.

Figure 8:
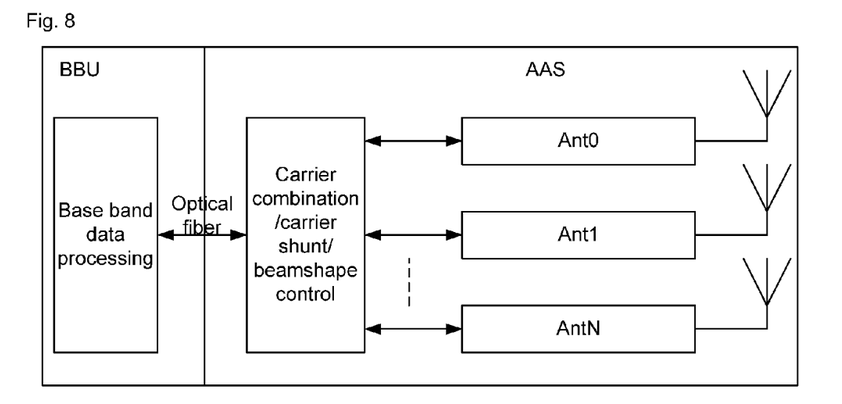
FIG. 8 is a schematic architectural diagram of a base station of a wireless access network to which the present disclosure is applied.

FIG. 8 is a schematic architectural diagram of a base station of a wireless access network to which the present disclosure is applied, as shown in FIG. 8, the beam forming is performed in an Adaptive Antenna System (AAS), a BBU is connected to the AAS through an optical fiber and the BBU processes base band data. Data carried by the optical fiber are a number of carriers M carried by a cell, wherein M is any number between 1 to 256. In a downlink direction, the active antenna butts base band data with the BBU through the optical fiber, after digital filtering and interpolation processing, digital signals of multiple channels are sent to a DAC for digital-to-analog conversion, then converted through a analog transmission channel and antenna arrays to OTA signals and sent out; in an uplink direction, respective antenna arrays receive OTA signals, the OTA signals are sent to ADC, after converted through an RF analog channel, for analog-to-digital conversion, then sent to the BBU after processed by the digital filtering and extracting processing. The beam forming and channel anomaly detection of the OTA are implemented in a digital IF portion of the active antenna.

Figure 9:
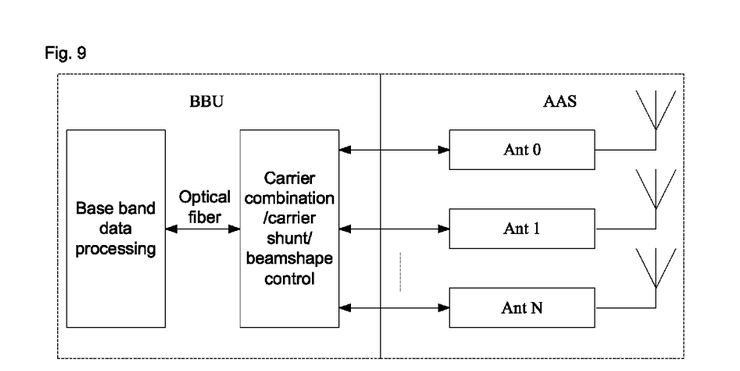
FIG. 9 is a schematic architectural diagram of a base station of another wireless access network to which the present disclosure is applied.

FIG. 9 is a schematic architectural diagram of a base station of another wireless access network to which the present disclosure is applied, as shown in FIG. 9, the beam forming is performed in a BBU, a BBU is connected to an AAS through an optical fiber and the BBU processes base band data. Data carried by the optical fiber are a product of a number of carriers M carried by a cell and a number of analog channel M of the active antenna, wherein N is any number between 1 to 32. A minimum rate which the optical fiber rate needs to meet is N times of that of the architecture as shown in FIG. 8. In the current optical port technique, an active antenna and the BBU support that K optical ports butt downlink data with the BBU, wherein K is any number between 1 to 128, the active antenna butts base band data with the BBU through the optical fiber, after digital filtering and interpolation processing, digital signals of multiple channels are sent to a DAC for digital-to-analog conversion, then converted through a analog transmission channel and antenna arrays to OTA signals and sent out; in an uplink direction, respective antenna arrays receive OTA signals, the OTA signals are sent to ADC, after converted through an RF analog channel, for analog-to-digital conversion, then sent to the BBU after processed by the digital filtering and extracting processing. The beam forming and channel anomaly detection of the OTA are implemented in the BBU side of the active antenna.

Figure 10:
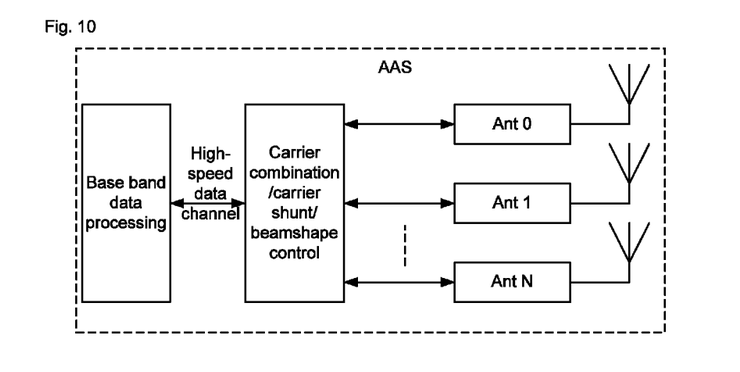
FIG. 10 is a schematic architectural diagram of a base station of a third wireless access network to which the present disclosure is applied.

FIG. 10 is a schematic architectural diagram of a base station of a third wireless access network to which the present disclosure is applied, as shown in FIG. 10, functions of a BBU and an AAS are combined, and the AAS has not only beam forming function but also all the functions of an existing BBU system, and can also implement functions of an existing RRU, thus it can be referred to as a highly-integrated active antenna. functions of the BBU's base band processing portion is combined into the active antenna, in the downlink direction, after base band data are processed by digital filtering and interpolation, digital signals of multiple channels are sent to a DAC for digital-to-analog conversion, then converted through a analog transmission channel and antenna arrays to OTA signals and sent out; in an uplink direction, respective antenna arrays receive OTA signals, the OTA signals are sent to ADC, after converted through an RF analog channel, for analog-to-digital conversion, then converted to base band data after processed by the digital filtering and extracting processing. The beam forming and channel anomaly detection of the OTA are implemented in the active antenna side.

What described are merely preferable embodiments of the present disclosure, and are not intended to limit the present disclosure.

The invention claimed is:

1. A method for detecting and repairing a channel anomaly of an active antenna, comprising:

determining an operation state of a transmission channel or a reception channel by analyzing in real time data of a feedback coupling channel or data of the reception channel, if the operation state is anomalous, performing an anomaly protection and reporting an alarm;

determining a level of the alarm and a reason causing the alarm, if data of the transmission/reception channel are anomalous and the anomaly protection is performed, storing a current antenna beam forming parameter and setting the antenna beam forming parameter to zero; after the alarm has been eliminated, setting a stored valid antenna beam forming parameter to a valid value; and if a transmission/reception analog channel operates anomalously and the anomaly protection is performed, re-acquiring the antenna beam forming parameter and configuring an acquired valid antenna beam forming parameter.

2. The method according to claim 1, further comprising:
detecting in real time whether a configured antenna beam forming parameter changes, if it changes, evaluating a changing procedure of the antenna beam forming parameter, if the changing procedure is abnormal, determining that the antenna beam forming parameter is invalid and discarding the antenna beam forming parameter.

3. The method according to claim 2, wherein the step of determining an operation state anomaly of the reception channel comprises:
collecting in real time uplink digital data of respective reception channels, calculating in real time powers of acquired uplink digital data of respective reception channels, and configuring in real time gains of analog channels according to the powers of the uplink digital data;
detecting and recording in real time configured analog gain values, and calculating uplink Over-The-Air (OTA) analog powers of respective reception channels and uplink OTA analog power differences between respective reception channels according to the analog gain values;
determining in real time whether recorded gain values are normal, determining in real time whether the powers of the uplink digital data change correctly with the gain values of the analog channels, and determining in real time whether the uplink reception OTA analog power differences between respective reception channels are normal; and
if the the gain values, powers or power differences are anomalous, representing that operation states of the reception channels are anomalous.

4. The method according to claim 2, wherein the step for determining an operation state anomaly of the transmission channel comprises:
detecting in sequence whether a clock, an optical port, a power of downlink base band data, a gain of downlink base band data, a power of downlink combining data, a gain of downlink combining data, a power of downlink analog data, a power of reverse channel data, a gain of reverse channel data, a phase of reverse channel data, a time delay of reverse channel data, a channel coupling power and a standing wave ratio are anomalous, if any one of detection results is anomalous, representing the operation state of the transmission channel is anomalous.

5. The method according to claim 1, wherein the step of determining an operation state anomaly of the reception channel comprises:
collecting in real time uplink digital data of respective reception channels, calculating in real time powers of acquired uplink digital data of respective reception channels, and configuring in real time gains of analog channels according to the powers of the uplink digital data;
detecting and recording in real time configured analog gain values, and calculating uplink Over-The-Air (OTA) analog powers of respective reception channels and uplink OTA analog power differences between respective reception channels according to the analog gain values;
determining in real time whether recorded gain values are normal, determining in real time whether the powers of the uplink digital data change correctly with the gain values of the analog channels, and determining in real time whether the uplink reception OTA analog power differences between respective reception channels are normal; and
if the the gain values, powers or power differences are anomalous, representing that operation states of the reception channels are anomalous.

6. The method according to claim 1, wherein the step for determining an operation state anomaly of the transmission channel comprises:
detecting in sequence whether a clock, an optical port, a power of downlink base band data, a gain of downlink base band data, a power of downlink combining data, a gain of downlink combining data, a power of downlink analog data, a power of reverse channel data, a gain of reverse channel data, a phase of reverse channel data, a time delay of reverse channel data, a channel coupling power and a standing wave ratio are anomalous, if any one of detection results is anomalous, representing the operation state of the transmission channel is anomalous.

7. A device for detecting and repairing a channel anomaly of an active antenna, comprising: a beam forming parameter detection module, a beam forming parameter configuration module, a beam forming parameter acquisition module and a beam forming parameter storage module, wherein
the beam forming parameter detection module is configured to determine an operation state of a transmission channel or a reception channel by analyzing in real time data of a feedback coupling channel or data of the reception channel, and perform an anomaly protection and report an alarm when it is determined that the operation state is anomalous;
the beam forming parameter detection module is further configured to: determine a level of the alarm and a reason causing the alarm, and when it is determined that data of the transmission/reception channel are anomalous and the anomaly protection is performed, notify the beam forming parameter storage module to perform a storage operation; set an antenna beam forming parameter configured by the beam forming parameter configuration module to zero; after the alarm has been eliminated, set a valid antenna beam forming parameter stored by the beam forming parameter storage module to a valid value; and when it is determined that a transmission/reception analog channel operates anomalously and the anomaly protection is performed, notify the beam forming parameter acquisition module;
the beam forming parameter configuration module is configured to configure a valid antenna beam forming parameter sent by the beam forming parameter acquisition module;
the beam forming parameter acquisition module is configured to, after receiving a notice from the beam forming parameter detection module, re-acquire the antenna beam forming parameter, and sent an acquired antenna beam forming parameter to the beam forming parameter configuration module; and
the beam forming parameter storage module is configured to, after receiving a notice from the beam forming parameter detection module, store a current antenna beam forming parameter value.

8. The device according to claim 7, wherein the beam forming parameter configuration module is further configured to: detect in real time whether an antenna beam forming parameter configured by itself changes, and when it is determined that the antenna beam forming parameter configured by itself changes, evaluate a changing procedure of the antenna beam forming parameter, if the changing procedure is abnormal, determine that the antenna beam forming parameter is invalid and discard the antenna beam forming parameter.

9. The device according to claim 8, when detecting an operation state of the reception channel, the beam forming parameter detection module is configured to: collect in real time uplink digital data of respective reception channels, calculate in real time powers of acquired uplink digital data of respective reception channels, and configure in real time gains of analog channels according to the powers of the uplink digital data; and detect and record in real time configured analog gain values, and calculate uplink Over-The-Air (OTA) analog powers of respective reception channels and uplink OTA analog power differences between respective reception channels according to the analog gain values; and the beam forming parameter detection module is further configured to: determine in real time whether recorded gain values are normal, determine in real time whether the powers of the uplink digital data change correctly with the gain values of the analog channels, determine in real time whether the uplink OTA analog power differences between respective reception channels are normal, and when any one of above determination results is anomalous, perform an anomaly protection and report an alarm, and set the configured antenna beam forming parameter to zero; and after the alarm has been eliminated, set the stored valid antenna beam forming parameter to a valid value.

10. The device according to claim 9, wherein the beam forming parameter detection module comprises: a data acquisition module, a gain control module, a gain detection module, a power calculation module, an anomaly determination module and a protection module, and wherein the data acquisition module is configured to collect in real time the uplink digital data of respective reception channels;

the gain control module is configured to configure in real time gains of analog channels according to powers of the uplink digital data;

the gain detection module is configured to detect and record in real time analog gain values configured by the gain control module;

the power calculation module is configured to: calculate in real time powers of the uplink digital data of respective reception channels acquired by the data acquisition module, and calculate uplink OTA analog powers of respective reception channels and uplink OTA analog power differences between respective reception channels according to analog gain values recorded by the gain detection module;

the anomaly determination module is configured to: determine in real time whether the gain values recorded by the gain detection module are normal, determine in real time whether the powers of the uplink digital data calculated by the power calculation module change correctly with the gain values of the analog channels recorded by the gain detection module, determine in real time whether the uplink OTA analog power differences between respective reception channels calculated by the power calculation module are normal, and when any one of above determination results is anomalous, notify the protection module; and the protection module is configured to: after receiving a notice from the anomaly determination module, perform an anomaly protection and report an alarm, and set the configured antenna beam forming parameter to zero; and after the alarm has been eliminated, set the stored valid antenna beam forming parameter to a valid value.

11. The device according to claim 8, wherein an operation state of the transmission channel is detected, the beam forming parameter detection module is configured to determine in sequence whether a clock, an optical port, a power of downlink base band data, a gain of downlink base band data, a power of downlink combining data, a gain of downlink combining data, a power of downlink analog data, a power of reverse channel data, a gain of reverse channel data, a phase of reverse channel data, a time delay of reverse channel data, a channel coupling power and a standing wave ratio are anomalous, and when any one of above determination results is anomalous, perform an anomaly protection and report an alarm and set the configured antenna beam forming parameter to zero, and after the alarm has been eliminated, set the stored valid antenna beam forming parameter to a valid value.

12. The device according to claim 11, wherein the beam forming parameter detection module comprises: a clock detection module, an optical port detection module, a downlink base band data power detection module, a downlink base band data gain detection module, a downlink combining data power detection module, a downlink combining data gain detection module, a downlink analog data power detection module, a reverse channel data power detection module, a reverse channel data gain detection module, a reverse channel data phase detection module, a reverse channel data time delay detection module, a channel coupling detection module, a standing wave ratio detection module and an anomaly detection module; and wherein the respective detection modules are configured to determine respectively in sequence whether the clock, the optical port, the power of downlink base band data, the gain of downlink base band data, the power of downlink combining data, the gain of downlink combining data, the power of downlink analog data, the power of reverse channel data, the gain of reverse channel data, the phase of reverse channel data, the time delay of reverse channel data, the channel coupling power and a standing wave ratio are anomalous, and when any one of determination results is anomalous, notify the anomaly detection module; and the anomaly detection module is configured to: after receiving a notice from the respective determination modules, perform an anomaly protection and report an alarm, and set the configured antenna beam forming parameter to zero; and after the alarm has been eliminated, set the stored valid antenna beam forming parameter to a valid value.

13. The device according to claim 7, when detecting an operation state of the reception channel, the beam forming parameter detection module is configured to: collect in real time uplink digital data of respective reception channels, calculate in real time powers of acquired uplink digital data of respective reception channels, and configure in real time gains of analog channels according to the powers of the uplink digital data; and detect and record in real time configured analog gain values, and calculate uplink Over-The-Air (OTA) analog powers of respective reception channels and uplink OTA analog power differences between respective reception channels according to the analog gain values; and the beam forming parameter detection module is further configured to: determine in real time whether recorded gain values are normal, determine in real time whether the powers of the uplink digital data change correctly with the gain values of the analog channels, determine in real time whether the uplink OTA analog power differences between respective reception channels are normal, and when any one of above determination results is anomalous, perform an anomaly protection and report an alarm, and set the configured antenna beam forming parameter to zero; and after the alarm has been eliminated, set the stored valid antenna beam forming parameter to a valid value.

14. The device according to claim 13, wherein the beam forming parameter detection module comprises: a data acquisition module, a gain control module, a gain detection module, a power calculation module, an anomaly determination module and a protection module, and wherein the data acquisition module is configured to collect in real time the uplink digital data of respective reception channels;

the gain control module is configured to configure in real time gains of analog channels according to powers of the uplink digital data;

the gain detection module is configured to detect and record in real time analog gain values configured by the gain control module;

the power calculation module is configured to: calculate in real time powers of the uplink digital data of respective reception channels acquired by the data acquisition module, and calculate uplink OTA analog powers of respective reception channels and uplink OTA analog power differences between respective reception channels according to analog gain values recorded by the gain detection module;

the anomaly determination module is configured to: determine in real time whether the gain values recorded by the gain detection module are normal, determine in real time whether the powers of the uplink digital data calculated by the power calculation module change correctly with the gain values of the analog channels recorded by the gain detection module, determine in real time whether the uplink OTA analog power differences between respective reception channels calculated by the power calculation module are normal, and when any one of above determination results is anomalous, notify the protection module; and the protection module is configured to: after receiving a notice from the anomaly determination module, perform an anomaly protection and report an alarm, and set the configured antenna beam forming parameter to zero; and after the alarm has been eliminated, set the stored valid antenna beam forming parameter to a valid value.

15. The device according to claim 7, wherein an operation state of the transmission channel is detected, the beam forming parameter detection module is configured to determine in sequence whether a clock, an optical port, a power of downlink base band data, a gain of downlink base band data, a power of downlink combining data, a gain of downlink combining data, a power of downlink analog data, a power of reverse channel data, a gain of reverse channel data, a phase of reverse channel data, a time delay of reverse channel data, a channel coupling power and a standing wave ratio are anomalous, and when any one of above determination results is anomalous, perform an anomaly protection and report an alarm and set the configured antenna beam forming parameter to zero, and after the alarm has been eliminated, set the stored valid antenna beam forming parameter to a valid value.

16. The device according to claim 15, wherein the beam forming parameter detection module comprises: a clock detection module, an optical port detection module, a downlink base band data power detection module, a downlink base band data gain detection module, a downlink combining data power detection module, a downlink combining data gain detection module, a downlink analog data power detection module, a reverse channel data power detection module, a reverse channel data gain detection module, a reverse channel data phase detection module, a reverse channel data time delay detection module, a channel coupling detection module, a standing wave ratio detection module and an anomaly detection module; and wherein the respective detection modules are configured to determine respectively in sequence whether the clock, the optical port, the power of downlink base band data, the gain of downlink base band data, the power of downlink combining data, the gain of downlink combining data, the power of downlink analog data, the power of reverse channel data, the gain of reverse channel data, the phase of reverse channel data, the time delay of reverse channel data, the channel coupling power and a standing wave ratio are anomalous, and when any one of determination results is anomalous, notify the anomaly detection module; and the anomaly detection module is configured to: after receiving a notice from the respective determination modules, perform an anomaly protection and report an alarm, and set the configured antenna beam forming parameter to zero; and after the alarm has been eliminated, set the stored valid antenna beam forming parameter to a valid value.

\* \* \* \* \*